(12) United States Patent
Oga et al.

(10) Patent No.: US 12,177,807 B2
(45) Date of Patent: Dec. 24, 2024

(54) INTERFACE CONVERSION DEVICE, CONTROL CIRCUIT, STORAGE MEDIUM, AND ANOMALY DETECTION METHOD

(71) Applicant: Mitsubishi Electric Corporation, Tokyo (JP)

(72) Inventors: Masao Oga, Tokyo (JP); Keijiro Take, Tokyo (JP); Ryo Matsunaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 265 days.

(21) Appl. No.: 17/841,340

(22) Filed: Jun. 15, 2022

(65) Prior Publication Data
US 2022/0312358 A1 Sep. 29, 2022

Related U.S. Application Data

(63) Continuation of application No. PCT/JP2020/007183, filed on Feb. 21, 2020.

(51) Int. Cl.
H04W 56/00 (2009.01)
H04W 92/18 (2009.01)

(52) U.S. Cl.
CPC ..... *H04W 56/0065* (2013.01); *H04W 56/001* (2013.01); *H04W 92/18* (2013.01)

(58) Field of Classification Search
None
See application file for complete search history.

(56) References Cited

U.S. PATENT DOCUMENTS

| 2006/0007878 A1* | 1/2006 | Xu | H04W 28/18 370/328 |
| 2021/0007160 A1 | 1/2021 | Sivasiva Ganesan et al. | |

(Continued)

FOREIGN PATENT DOCUMENTS

| JP | 2018-201110 A | 12/2018 |
| WO | WO 2019/166081 A1 | 9/2019 |

(Continued)

OTHER PUBLICATIONS

3GPP TR 23.734 V16.2.0, "3rd Generation Partnership Project; Technical Specification Group Services and System Aspects; Study on enhancement of 5G System (5GS) for vertical and Local Area Network (LAN) services; (Release 16)", Jun. 2019, pp. 1-117.

(Continued)

*Primary Examiner* — Jamaal Henson
(74) *Attorney, Agent, or Firm* — Birch, Stewart, Kolasch & Birch, LLP

(57) ABSTRACT

An interface conversion device of a mobile communication system includes: a delay amount measurement unit that measures a delay amount from a difference between an input time at which the mobile communication system has acquired a periodically transmitted time-synchronization signal and an output time at which the mobile communication system outputs the time-synchronization signal; a memory that stores delay amount history information including the measured delay amount; a variation evaluation unit that measures a variation amount indicating an instantaneous variation of the delay amount, using the delay amount history information and evaluates whether the variation amount is within an allowable range; and an anomaly detection unit that detects a communication anomaly in the mobile communication system on the basis of a result of the evaluation.

8 Claims, 16 Drawing Sheets

(56) References Cited

U.S. PATENT DOCUMENTS

| | | | |
|---|---|---|---|
| 2021/0175722 A1* | 6/2021 | Zafirovic-Vukotic | ........................ H04L 43/0852 |
| 2021/0243771 A1 | 8/2021 | Mannweiler et al. | |
| 2021/0273736 A1* | 9/2021 | Li | .......................... H04W 76/12 |

FOREIGN PATENT DOCUMENTS

| | | | | |
|---|---|---|---|---|
| WO | WO 2019/214810 A1 | | 11/2019 | |
| WO | WO-2020067977 A1 | * | 4/2020 | ............ H04J 3/0664 |
| WO | WO-2020081060 A1 | * | 4/2020 | |

OTHER PUBLICATIONS

3GPP TS 23.501 V16.2.0, "3rd Generation Partnership Project; Technical Specification Group Services and System Aspects; System Architecture for the 5G System (5GS); Stage 2; (Release 16)", Sep. 2019, pp. 1-390.

International Search Report for PCT/JP2020/007183 mailed on May 12, 2020.

Written Opinion of the International Searching Authority for PCT/JP2020/007183 mailed on May 12, 2020.

Chinese Office Action and Search Report for Chinese Application No. 202080096774.2, dated Sep. 8, 2023, with an English translation.

Chinese Office Action for Chinese Application No. 202080096774.2, dated Mar. 9, 2024, with English translation.

Chinese Office Action for Chinese Application No. 202080096774.2, dated Jul. 12, 2024, with a partial English translation.

* cited by examiner

FIG.6

| TRAFFIC CLASS | SET VALUE | PRIORITY |
|---|---|---|
| TC#7 | 111 | HIGH |
| TC#6 | 110 | |
| TC#5 | 101 | |
| TC#4 | 100 | |
| TC#3 | 011 | |
| TC#2 | 010 | |
| TC#1 | 001 | |
| TC#0 | 000 | LOW |

| TIME | TRANSMISSION GATE STATE | | | | | | | |
|---|---|---|---|---|---|---|---|---|
| | #7 | #6 | #5 | #4 | #3 | #2 | #1 | #0 |
| T00 | Open | Closed | Open | Open | Closed | Open | Open | Open |
| T01 | Closed | Open | Closed | Open | Open | Closed | Closed | Open |
| T02 | Open | Closed | Open | Open | Closed | Open | Open | Open |
| T03 | Open | Open | Closed | Open | Open | Closed | Closed | Open |
| ⋮ | | | | | | | | |
| T78 | Open | Closed | Open | Open | Closed | Open | Open | Open |
| T79 | Closed | Open | Closed | Open | Open | Closed | Closed | Closed |

| No. | DELAY AMOUNT MEASUREMENT VALUE [μsec] | DELAY AMOUNT REFERENCE VALUE [μsec] |
|---|---|---|
| 0 | 1200 | 1034 |
| 1 | 1100 | |
| 2 | 900 | |
| ⋮ | | |
| N-2 | 950 | |
| N-1 | 1020 | |

| TRANSMISSION QUEUE NUMBER | TRAFFIC CLASS | VARIATION EVALUATION REFERENCE VALUE [ns] |
|---|---|---|
| 0 | 0 | - |
| 1 | 1 | 1000000 |
| 2 | 2 | 1000000 |
| 3 | 3 | 500000 |
| 4 | 4 | 500000 |
| 5 | 5 | 10000 |
| 6 | 6 | 5000 |
| 7 | 7 | 1000 |

611　612　613

610

INTERFACE CONVERSION DEVICE, CONTROL CIRCUIT, STORAGE MEDIUM, AND ANOMALY DETECTION METHOD

CROSS-REFERENCE TO RELATED APPLICATION

This application is a continuation application of International Application PCT/JP2020/007183, filed on Feb. 21, 2020, and designating the U.S., the entire contents of which are incorporated herein by reference.

BACKGROUND OF THE INVENTION

1. Field of the Invention

The present disclosure relates to an interface conversion device, a control circuit, a storage medium, and an anomaly detection method in a mobile wireless communication network.

2. Description of the Related Art

5th generation mobile communication (hereinafter, referred to as 5G) systems is standardized under the 3rd Generation Partnership Project (3GPP). Utilization of High reliability and low latency of such 5G systems in industrial applications are under consideration, and the 5G systems are requested to support time-sensitive communication (TSC) that provides highly accurately time-synchronized communication in industrial Ethernet (registered trademark) or the like. In order to support Time-Sensitive Networking (TSN) protocols such as IEEE 802.1AS and IEEE 802.1Qbv standardized by Institute of Electrical and Electronics Engineers (IEEE) without affecting industrial devices having relied on a communication environment provided by wired connection such as a local area network (LAN) in a factory, it is necessary to reliably transmit control information for communicating with the industrial devices as well as to reduce a transmission delay, fluctuation, etc. of an Ethernet packet that transmits an industrial protocol for Control & Communication (CC)-Link IE (Industrial Ethernet (registered trademark)) TSN, etc. in a mobile communication network that varies due to a radio wave environment, movement, and the like. To this end, a technique for achieving high reliability and low latency of a 5G system expected to be applied to an industrial network is being normalized. On the other hand, a problem with wireless industrial networks is that when trouble such as a communication failure occurs, reproducibility of such wireless industrial networks is low and it is difficult to analyze the factor.

WO2019/166081 discloses a solution to such a problem. WO2019/166081 provides a technique for achieving a wireless industrial network. For the technique of WO2019/166081, an interface conversion device is provided for converting a 5G system into a logical TSN Bridge on an industrial network. A quality of service (QoS), which is a communication quality parameter that should be guaranteed from a TSN control device that manages a TSN Bridge, an End Station, etc. is converted into a communication quality parameter of the 5G system for use. The required quality of an industrial protocol using TSN is guaranteed on the 5G system.

A radio wave environment can change due to movement, shielding, or the like. When such a change occurs, history information on the industrial device enables the above-described conventional technique to identify a problem arising during operation of the industrial device. Unfortunately, such history information is not useful for analyzing the factor of a problem related to wireless communication, specify the cause of the wireless-communication-related problem, etc.

The present disclosure has been made in view of the above, and an object thereof is to obtain an interface conversion device capable of detecting a communication failure in a mobile wireless communication network on which an industrial protocol is transmitted.

SUMMARY OF THE INVENTION

To solve the above problem and achieve the object, the present disclosure provides an interface conversion device of a mobile communication system to transmit an industrial protocol. The interface conversion device comprises: a delay amount measurement unit to measure a delay amount inside the mobile communication system from a difference between an input time at which the mobile communication system has acquired a periodically transmitted time-synchronization signal and an output time at which the mobile communication system outputs the time-synchronization signal, the input time being included in the time-synchronization signal; a storage unit to store delay amount history information including a delay amount measurement value measured by the delay amount measurement unit; a variation evaluation unit to measure a variation amount indicating an instantaneous variation of the delay amount, using the delay amount history information and to evaluate whether the variation amount is within an allowable range; and an anomaly detection unit to detect a communication anomaly in the mobile communication system on a basis of an evaluation result provided by the variation evaluation unit.

BRIEF DESCRIPTION OF THE DRAWINGS

FIG. 6 is a diagram illustrating examples of traffic classes of transmission queues of the time-division scheduling function unit of the device-side interface conversion device according to the present embodiment;

FIG. 7 is a diagram illustrating an example configuration of a gate control list of the time-division scheduling function unit of the device-side interface conversion device according to the present embodiment;

FIG. 9 is a diagram illustrating an example of delay amount history information stored in a memory of the device-side interface conversion device according to the present embodiment;

FIG. 10 is a diagram illustrating an example of a variation amount evaluation reference table stored in the memory of the device-side interface conversion device according to the present embodiment;

DETAILED DESCRIPTION OF THE PREFERRED EMBODIMENTS

Hereinafter, an interface conversion device, a control circuit, a storage medium, and an anomaly detection method according to an embodiment of the present disclosure will be described in detail with reference to the drawings. The disclosure is not limited to the embodiment. In the following description, a mobile wireless communication network will be described on the premise that the mobile wireless communication network is a 5G system, but the present disclosure is not limited thereto.

Embodiment

Figure 1:
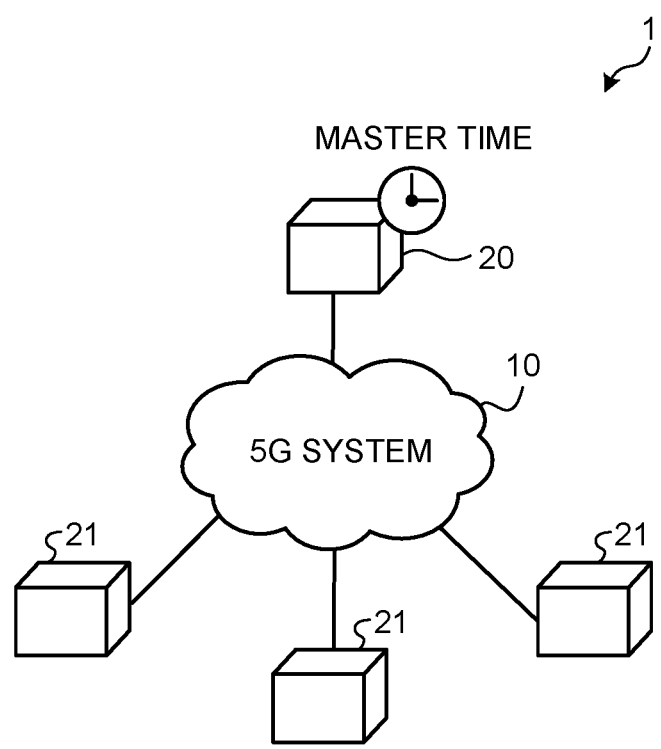
FIG. 1 is a diagram illustrating an example configuration of a mobile wireless communication network according to the present embodiment.

FIG. 1 is a diagram illustrating an example configuration of a mobile wireless communication network 1 according to the present embodiment. The mobile wireless communication network 1 is a network that supports TSC. The mobile wireless communication network 1 includes a 5G system 10, a TSN Bridge 20, and TSN devices 21. The 5G system 10 is a mobile communication system that transmits an industrial protocol. The 5G system 10 includes communication devices conforming to 5G wireless standards, and provides services on the mobile wireless communication network 1. The TSN devices 21 are each a communication device such as a TSN Bridge or an End Station. The TSN Bridge 20 is synchronized with master time of TSN, performs time synchronization with the TSN devices 21 via the 5G system 10, and communicates an industrial protocol and the like.

Figure 2:
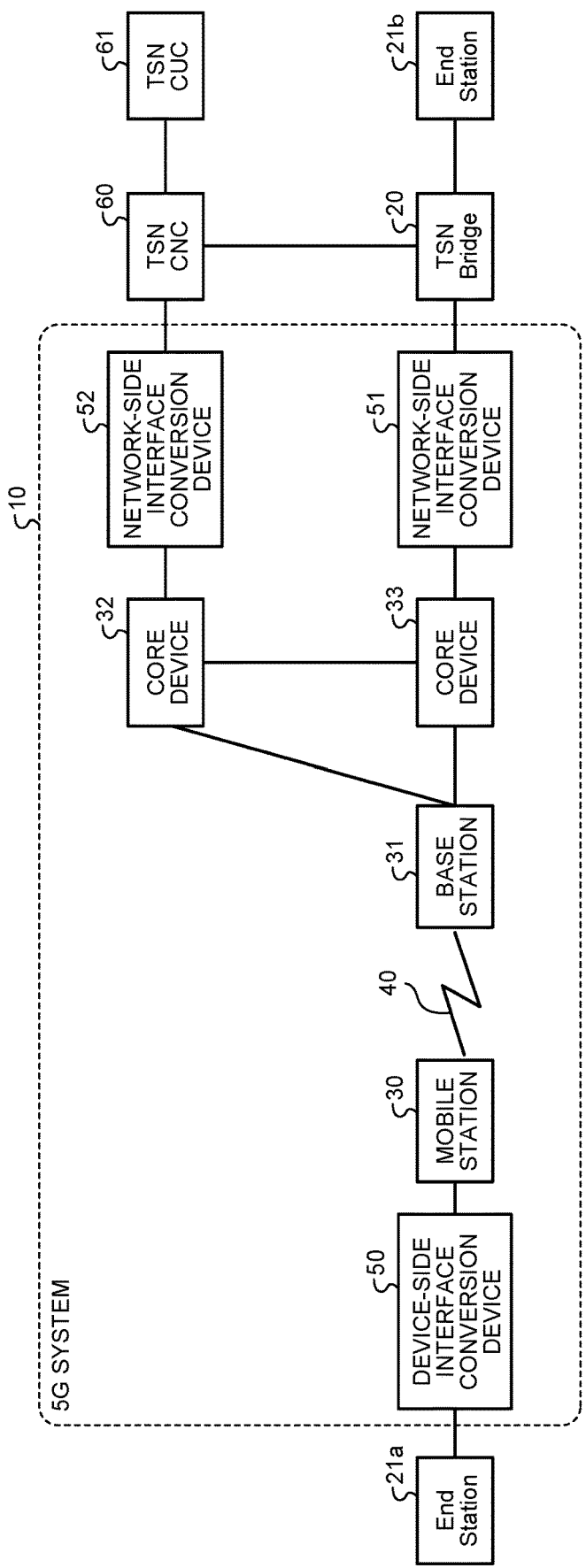
FIG. 2 is a diagram illustrating an example configuration of a TSN bridge of a 5G system according to the present embodiment.

A configuration of the 5G system 10 will be described. FIG. 2 is a diagram illustrating an example configuration of a TSN bridge of the 5G system 10 according to the present embodiment. In the 3GPP standards, when viewed from the TSN Bridge 20, the TSN devices 21, and the like connected to the 5G system 10, it can be considered that the 5G system 10 constitutes one logical TSN Bridge. Among the TSN devices 21 illustrated in FIG. 1, for example, the TSN device 21 arranged on a device side is defined as an End Station 21$a$, and the TSN device 21 arranged on a network side is defined as an End Station 21$b$. Note that some of the communication devices connected to the 5G system 10 illustrated in FIG. 2 replace the communication devices connected to the 5G system 10 illustrated in FIG. 1.

The 5G system 10 includes a mobile station 30, a base station 31, core devices 32 and 33, a device-side interface conversion device 50, and network-side interface conversion devices 51 and 52. In the 5G system 10, a service area is defined by a wireless signal 40 transmitted from the base station 31, and the mobile station 30 in the service area is connected to the base station 31 through the wireless signal 40.

The core device 32 is a device that performs call control, an authentication process, and location management of the mobile station 30. The core device 32 controls the base station 31.

The core device 33 is a gateway device that transfers data when the mobile station 30 performs communication via the base station 31. The core device 33 performs a transfer process of an industrial protocol in communication performed among the End Station 21$a$, the TSN Bridge 20, and the End Station 21$b$.

The device-side interface conversion device 50 is an interface conversion device that performs a conversion process of a TSN protocol between the End Station 21$a$ and the mobile station 30 and relays an Ethernet packet that transmits an industrial protocol.

The network-side interface conversion device 51 is an interface conversion device that performs a conversion process of a TSN protocol between the TSN Bridge 20 and the core device 33 and relays an Ethernet packet that transmits an industrial protocol.

The network-side interface conversion device 52, which is a device for controlling the TSN, is an interface conversion device that performs protocol conversion for converting QoS setting, etc. from a time-sensitive networking centralized network configuration (TSNCNC) 60 and a time-sensitive networking centralized user configuration (TSN-CUC) 61 into QoS setting for the 5G system 10. The TSNCNC 60 and the TSNCUC 61 are in charge of user setting, network setting, etc. Furthermore, the network-side interface conversion device 52 transmits port setting information, etc. of the device-side interface conversion device 50 via a wireless protocol.

Note that the 5G system 10 is configured such that a plurality of mobile stations 30 can be connected under the control of the base station 31, and a plurality of base stations 31 can be connected under the control of the core devices 32 and 33. Although only one TSN device 21 is connected to each of the device-side interface conversion device 50 and the network-side interface conversion device 51 in the example of FIG. 2, a plurality of TSN devices 21 can be connected thereto through LAN connection.

Figure 3:
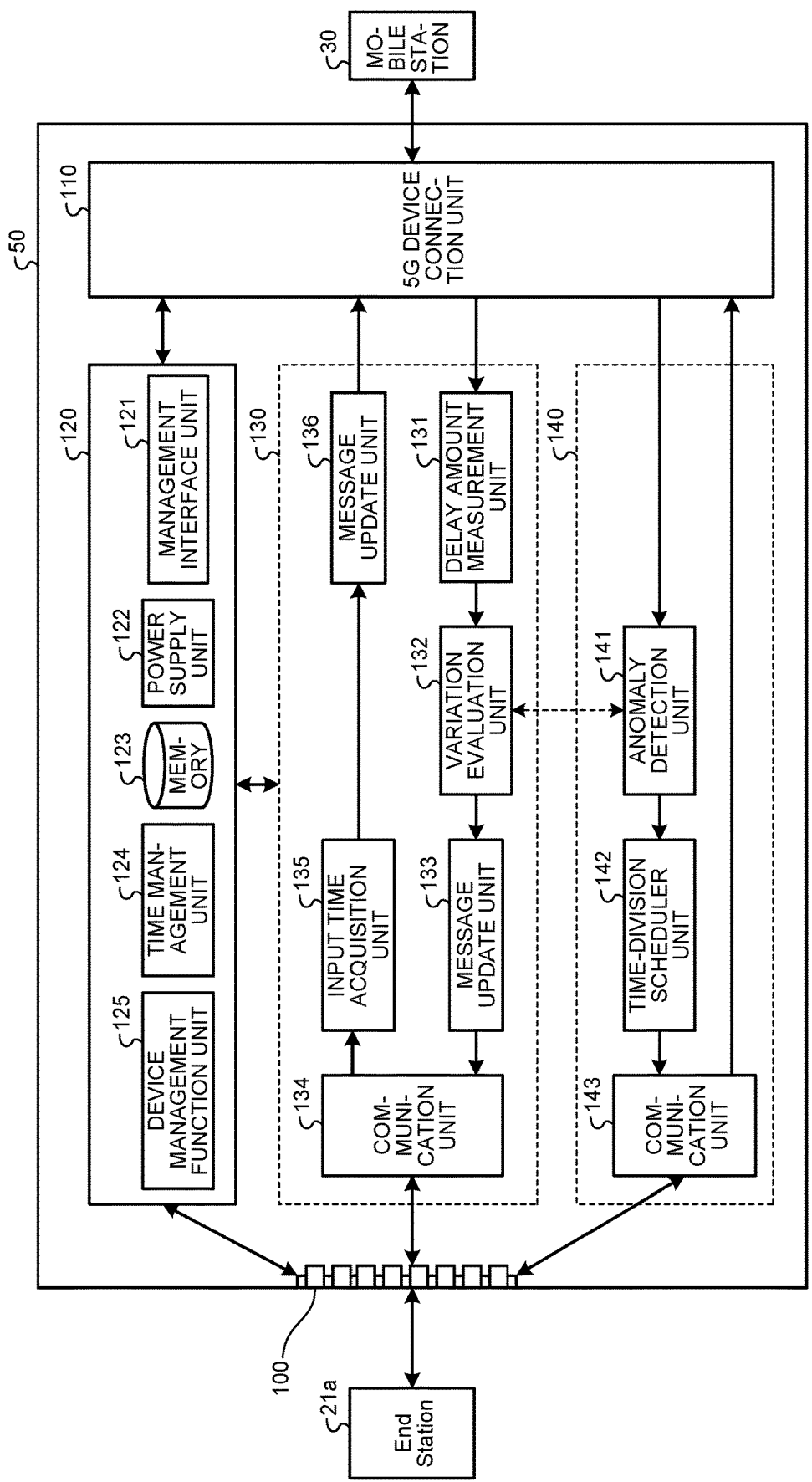
FIG. 3 is a block diagram illustrating an example configuration of a device-side interface conversion device according to the present embodiment.

A configuration of the device-side interface conversion device 50 included in the 5G system 10 will be described. FIG. 3 is a block diagram illustrating an example configuration of the device-side interface conversion device 50 according to the present embodiment. The device-side interface conversion device 50 includes an external interface 100, a 5G device connection unit 110, a device management unit 120, a time-synchronization function unit 130, and a time-division scheduling function unit 140.

The external interface 100 is a physical interface provided by a registered jack (RJ) 45, etc. connected to the End Station 21a.

The 5G device connection unit 110 includes an interface connected to the mobile station 30. The 5G device connection unit 110 can be connected to the mobile station through Ethernet, a universal serial bus (USB), etc. depending on the configuration of the mobile station 30.

The device management unit 120 performs setting, management, etc. of the device-side interface conversion device 50. The device management unit 120 includes a management interface unit 121, a power supply unit 122, a memory 123, a time management unit 124, and a device management function unit 125. The management interface unit 121 communicates with control devices such as the network-side interface conversion device 52, the TSNCNC 60, and the TSNCUC 61, and acquires, for example, information on setting of the device-side interface conversion device 50. The power supply unit 122 supplies power to each component of the device-side interface conversion device 50. The memory 123 is a storage unit that stores setting information such as device parameters for the operation of the device-side interface conversion device 50 and TSN protocol-related parameters. The time management unit 124 manages time information acquired from the time-synchronization function unit 130. The device management function unit 125 manages a device state such as an operating state of the device-side interface conversion device 50.

The time-synchronization function unit 130 performs a time-synchronization process of IEEE 802.1AS. The time-synchronization function unit 130 includes a delay amount measurement unit 131, a variation evaluation unit 132, a message update unit 133, a communication unit 134, an input time acquisition unit 135, and a message update unit 136. The delay amount measurement unit 131 measures a delay amount inside the 5G system 10. The variation evaluation unit 132 evaluates, from delay amount history information, a variation amount of the delay amount inside the 5G system 10. The delay amount history information is past delay amount measurement information. The message update unit 133 adds the delay amount in the 5G system 10 to correction Field of a message used in the TSN protocol. The description herein is based on the assumption that the message used in the TSN protocol is a SYNC message. The SYNC message is a time-synchronization signal. The communication unit 134 transmits, to the End Station 21a via the external interface 100, the SYNC message having time information updated. At a time of reception of the SYNC message received from the external TSN Bridge 20, the input time acquisition unit 135 acquires time information from the time management unit 124. The time information which the input time acquisition unit 135 acquires from the time management unit 124 is input time indicating a time at which the 5G system 10 acquires the SYNC message. The message update unit 136 adds the input time to the SYNC message.

The time-division scheduling function unit 140 controls a transmission time of each traffic class defined in IEEE 802.1Qbv in highly accurate synchronization with other TSN devices 21. The time-division scheduling function unit 140 includes an anomaly detection unit 141, a time-division scheduler unit 142, and a communication unit 143. Using an evaluation result provided by the variation evaluation unit 132, the anomaly detection unit 141 determines a risk level of each Ethernet packet received by the 5G system 10. The time-division scheduler unit 142 controls a transmission time for each of traffic classes of Ethernet packets. Using Ethernet packets, the communication unit 143 communicates with the End Station 21a via the external interface 100.

Figure 4:
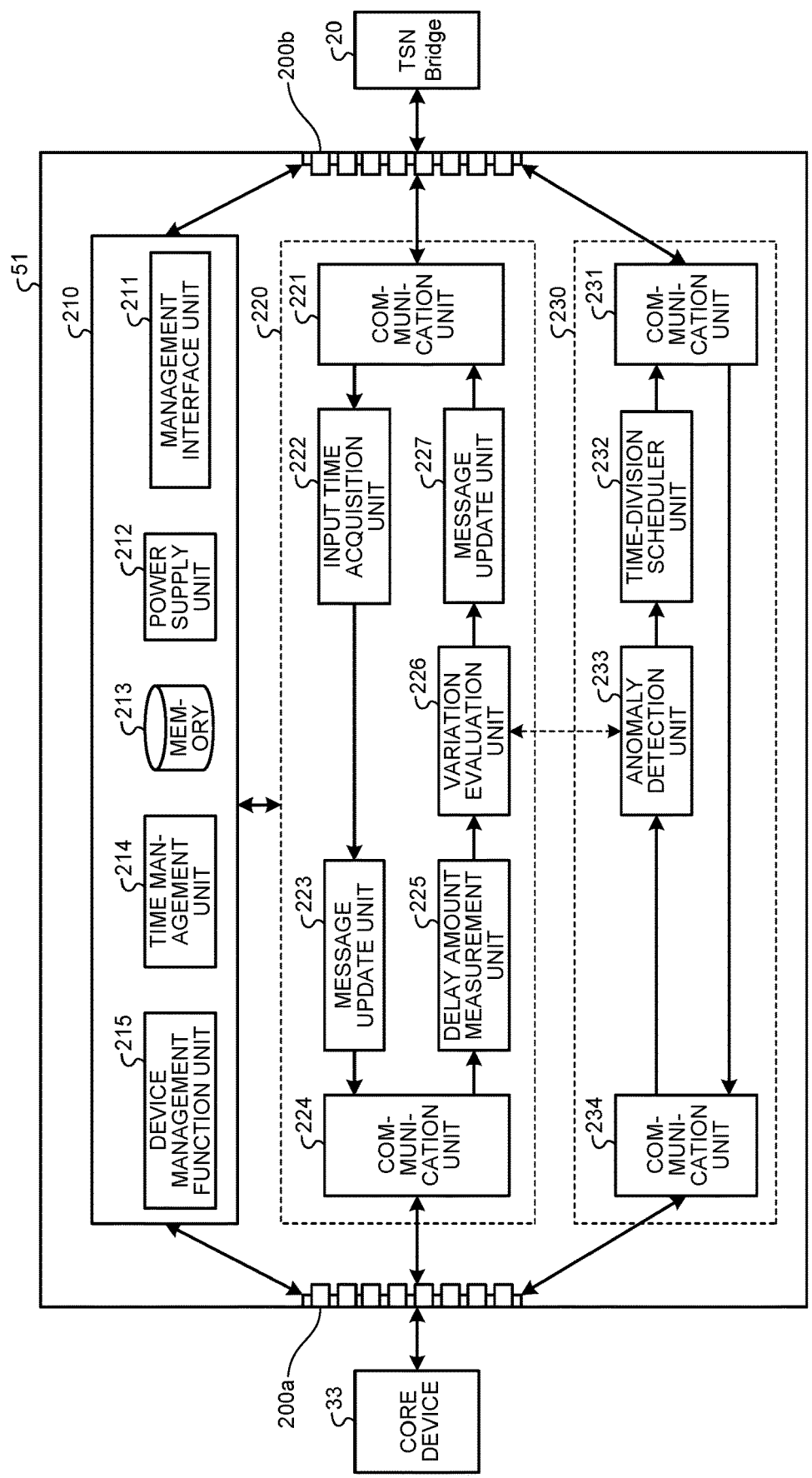
FIG. 4 is a block diagram illustrating an example configuration of a network-side interface conversion device according to the present embodiment.

A configuration of the network-side interface conversion device 51 included in the 5G system 10 will be described. FIG. 4 is a block diagram illustrating an example configuration of the network-side interface conversion device 51 according to the present embodiment. The network-side interface conversion device 51 includes external interfaces 200a and 200b, a device management unit 210, a time-synchronization function unit 220, and a time-division scheduling function unit 230.

The external interface 200a is a physical interface provided by the RJ 45, etc. connected to the core device 33.

The external interface 200b is a physical interface provided by the RJ 45, etc. connected to the TSN Bridge 20.

The device management unit 210 performs setting, management, etc. of the network-side interface conversion device 51. The device management unit 210 includes a management interface unit 211, a power supply unit 212, a memory 213, a time management unit 214, and a device management function unit 215. The management interface unit 211 communicates with control devices such as the network-side interface conversion device 52, the TSNCNC 60, and the TSNCUC 61, and acquires, for example, information on setting of the network-side interface conversion device 51. The power supply unit 212 supplies power to each component of the network-side interface conversion device 51. The memory 213 is a storage unit that stores setting information such as device parameters for the operation of the network-side interface conversion device 51 and TSN protocol-related parameters. The time management unit 214 manages time information acquired from the time-synchronization function unit 220. The device management function unit 215 manages a device state such as an operating state of the network-side interface conversion device 51.

The time-synchronization function unit 220 performs a time-synchronization process of IEEE 802.1AS. The time-synchronization function unit 220 includes a communication unit 221, an input time acquisition unit 222, a message update unit 223, a communication unit 224, a delay amount measurement unit 225, a variation evaluation unit 226, and a message update unit 227. Using the TSN protocol, the communication unit 221 communicates with the TSN Bridge 20 via the external interface 200b. At a time of reception of the SYNC message, the input time acquisition unit 222 acquires time information from the time management unit 214. The time information which the input time acquisition unit 222 acquires from the time management unit 214 is input time indicating a time at which the 5G system 10 acquires the SYNC message. The message update unit 223 adds the input time to the SYNC message. The communication unit 224 transmits the updated SYNC message to the core device 33 via the external interface 200a. The delay amount measurement unit 225 measures a delay amount inside the 5G system 10. The variation evaluation unit 226 evaluates a variation amount of the delay amount inside the 5G system 10, from delay amount history information that is past delay amount measurement information. The message update unit 227 adds the delay amount in the 5G system 10 to correction Field of a message used in the TSN protocol. The description is based on the assumption that the message used in the TSN protocol is the SYNC message. The communication unit 221 further transmits, to the TSN Bridge 20 via the external interface 200*b*, the SYNC message having time information updated.

The time-division scheduling function unit 230 controls a transmission time of each traffic class defined in IEEE 802.1Qbv in highly accurate synchronization with other TSN devices 21. The time-division scheduling function unit 230 includes a communication unit 231, a time-division scheduler unit 232, an anomaly detection unit 233, and a communication unit 234. Using Ethernet packets, the communication unit 231 communicates with the TSN Bridge 20 via the external interface 200*b*. The time-division scheduler unit 232 controls a transmission time for each of traffic classes of Ethernet packets. Using an evaluation result provided by the variation evaluation unit 226, the anomaly detection unit 233 determines a risk level of each Ethernet packet received by the 5G system 10. Using Ethernet packets, the communication unit 234 performs communication via the external interface 200*a*.

Configurations of the time-division scheduling function unit 140 of the device-side interface conversion device 50 and the time-division scheduling function unit 230 of the network-side interface conversion device 51 will be described. The configurations of the time-division scheduling function unit 140 of the device-side interface conversion device 50 and the time-division scheduling function unit 230 of the network-side interface conversion device 51 are similar to each other. A description will be thus made as to the time-division scheduling function unit 140 of the device-side interface conversion device 50 by way of example.

Figure 5:
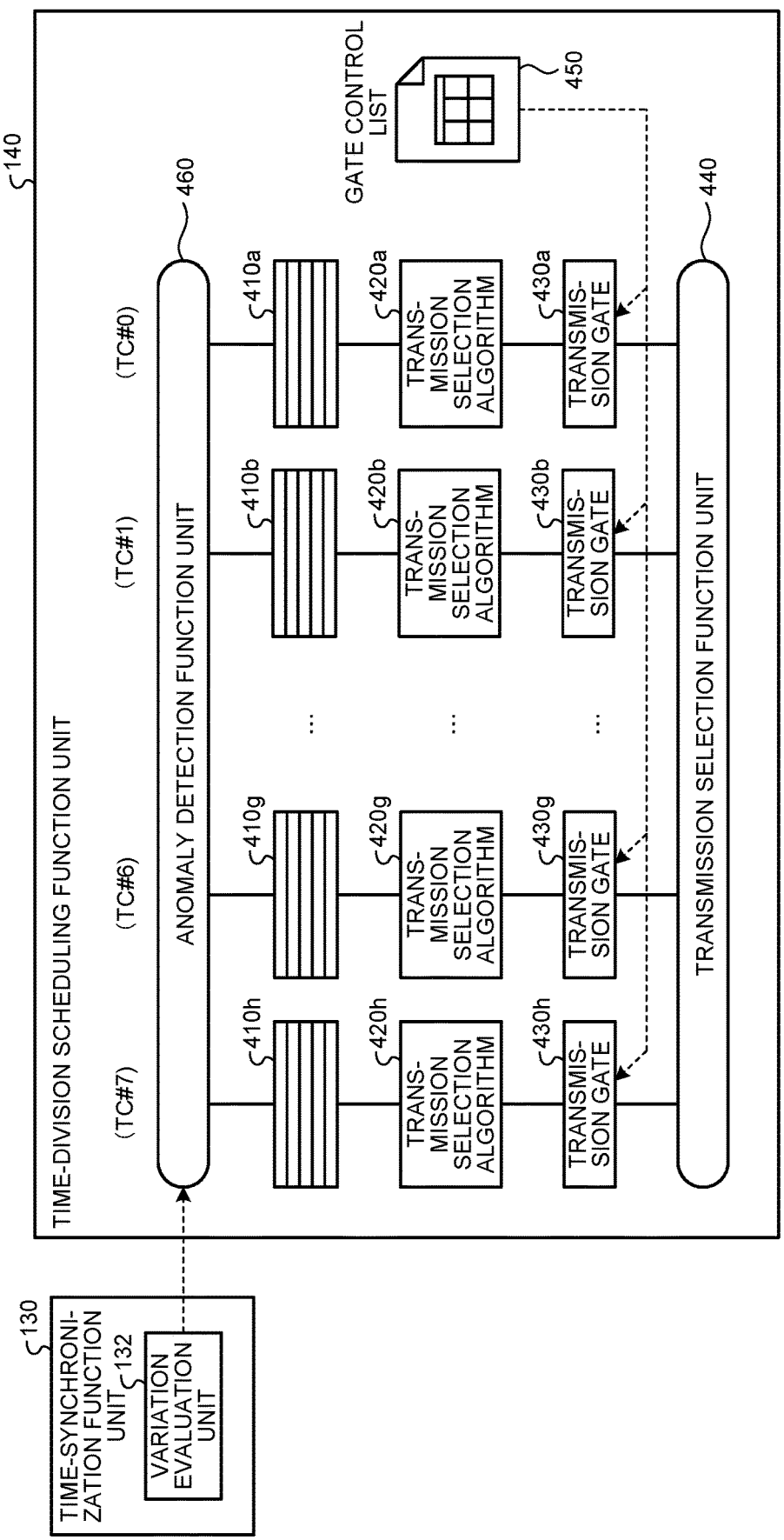
FIG. 5 is a diagram illustrating an example configuration of a time-division scheduling function unit of the device-side interface conversion device according to the present embodiment.

FIG. 5 is a diagram illustrating an example configuration of the time-division scheduling function unit 140 of the device-side interface conversion device 50 according to the present embodiment. The time-division scheduling function unit 140 includes transmission queues 410*a* to 410*h*, transmission selection algorithms 420*a* to 420*h*, transmission gates 430*a* to 430*h*, a transmission selection function unit 440, a gate control list 450, and an anomaly detection function unit 460. The anomaly detection function unit 460 corresponds to the anomaly detection unit 141 illustrated in FIG. 3. The transmission queues 410*a* to 410*h*, the transmission selection algorithms 420*a* to 420*h*, the transmission gates 430*a* to 430*h*, and the gate control list 450 correspond to the time-division scheduler unit 142 illustrated in FIG. 3. The transmission selection function unit 440 corresponds to the communication unit 143 illustrated in FIG. 3.

The transmission queues 410*a* to 410*h* are transmission queues corresponding to traffic classes each indicating a priority associated with a priority code point (PCP) defined in IEEE 802.1p described in FIG. 6 in order to provide a function of controlling a transmission time of each traffic class in the process of transmitting an Ethernet packet transmission from the 5G system 10 to the End Station 21*a* which is the external TSN device 21.

FIG. 6 is a diagram illustrating examples of traffic classes 470 of transmission queues 410*a* to 410*h* of the time-division scheduling function unit 140 of the device-side interface conversion device 50 according to the present embodiment. The transmission queue 410*a* corresponds to traffic class TC #0, the transmission queue 410*b* corresponds to traffic class TC #1, the transmission queue 410*c* corresponds to traffic class TC #2, and the transmission queue 410*d* corresponds to traffic class TC #3. In addition, the transmission queue 410*e* corresponds to traffic class TC #4, the transmission queue 410*f* corresponds to traffic class TC #5, the transmission queue 410*g* corresponds to traffic class TC #6, and the transmission queue 410*h* corresponds to traffic class TC #7. FIGS. 5 and 6 indicate that the transmission queue 410*a* of traffic class TC #0 has the lowest priority, the larger the traffic class number, the higher the priority, and the transmission queue 410*h* of traffic class TC #7 has the highest priority. In FIG. 6, set values are each information that can identify a corresponding one of traffic classes.

The transmission selection algorithms 420*a* to 420*h* determine whether data stored in the corresponding transmission queues 410*a* to 410*h* can be transmitted.

The transmission gates 430*a* to 430*h* each control "Open" and "Closed" of the gate on the basis of time specified in the gate control list 450 and information provided by the corresponding one of the transmission selection algorithms 420*a* to 420*h* as to whether the corresponding one of the transmission queues 410*a* to 410*h* can be transmitted.

The transmission selection function unit 440 transmits, to an external device, data having passed through the transmission gates 430*a* to 430*h*.

The anomaly detection function unit 460 determines a risk level of each of Ethernet packets input to the transmission queues 410*a* to 410*h*, from an evaluation result provided by the variation evaluation unit 132 of the time-synchronization function unit 130.

The gate control list 450 defines "Open" and "Closed" of the transmission gates 430*a* to 430*h*. FIG. 7 is a diagram illustrating an example configuration of the gate control list 450 of the time-division scheduling function unit 140 of the device-side interface conversion device 50 according to the present embodiment. As illustrated in FIG. 7, the gate control list 450 has transmission gate states 452 registered. In the transmission gate states 452, "Open", which is a time zone in which each transmission gate can perform transmission, and "Closed", which is a time zone in which each transmission gate cannot perform transmission, are defined for each time 451.

The 5G system 10 can effect stable priority control by allowing highly accurate time synchronization among the device-side interface conversion device 50, the network-side interface conversion device 51, and the TSN Bridge 20, and by synchronizing the transmission times of the traffic classes of the time-division scheduling function unit 140 of the device-side interface conversion device 50 and those of the time-division scheduling function unit 230 of the network-side interface conversion device 51. Note that, although the delay amount inside the 5G system 10 varies, it is possible to perform synchronized-time division scheduling also via the 5G system 10 by adding a maximum delay amount guaranteed by QoS control of the 5G system 10 as an offset.

Figure 8:
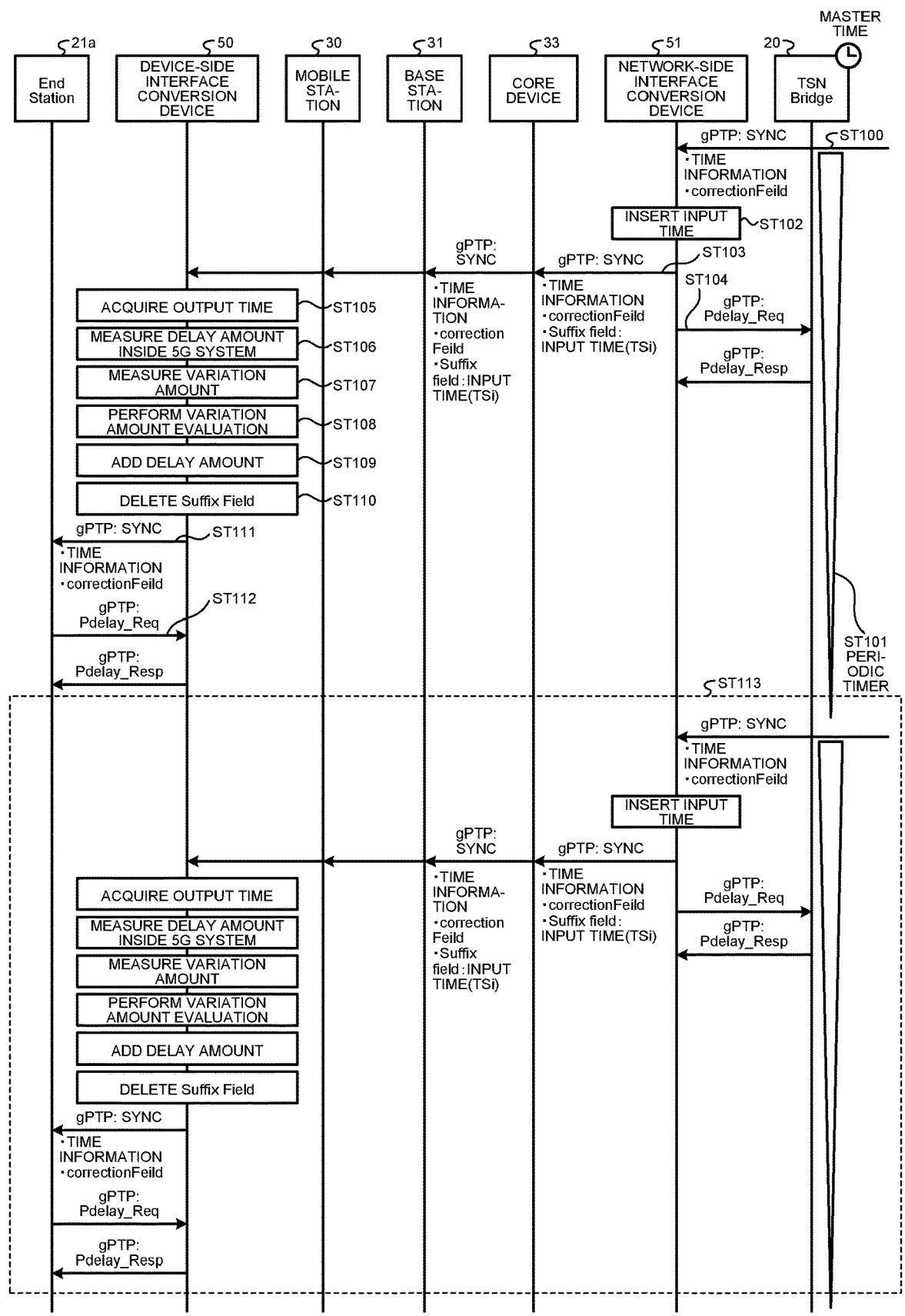
FIG. 8 is a sequence diagram illustrating an example of an anomaly detection process during a time-synchronization process performed by the 5G system according to the present embodiment.

Next, a description will be given for a variation evaluation procedure for detecting an anomaly in the device-side interface conversion device 50 in a time-synchronization process of the TSN protocol started from the TSN Bridge 20 synchronized with master time. FIG. 8 is a sequence diagram illustrating an example of an anomaly detection process during a time-synchronization process performed by the 5G system 10 according to the present embodiment.

When it is time to start a periodic time-synchronization process, TSN Bridge 20 sets, in a SYNC message, time information and correction Field for accumulating each path delay. The SYNC message is a generalized precision time protocol (gPTP) packet. TSN Bridge 20 transmits the SYNC message to the TSN device 21 therearound such as the network-side interface conversion device 51 (step ST100). At that time, the TSN Bridge 20 starts a periodic timer that measures a period of the time-synchronization process for transmitting the SYNC message next time (step ST101).

In the network-side interface conversion device 51 that has received the SYNC message, the input time acquisition unit 222 acquires an input time TSi from the time management unit 214. The input time TSi is a time at which the network-side interface conversion device 51 has received the SYNC message. The message update unit 223 inserts the input time TSi into Suffix Field of the SYNC message (step ST102). The communication unit 224 transmits, to the core device 33, the SYNC message updated by the message update unit 223 (step ST103). As a result, the SYNC message reaches the device-side interface conversion device 50 via the base station 31 and the mobile station 30. Following the SYNC message process, the network-side interface conversion device 51 measures a path delay between the network-side interface conversion device 51 and the TSN Bridge 20 (step ST104). Specifically, the network-side interface conversion device 51 transmits a Pdelay_Req message which is a gPTP packet to the TSN Bridge 20, and receives a Pdelay_Resp message which is a gPTP packet from the TSN Bridge 20.

In the device-side interface conversion device 50 that has received the SYNC message, the delay amount measurement unit 131 acquires an output time TSe from the time management unit 124 (step ST105). The output time TSe indicates a time at which the SYNC message is output from the 5G system 10. The delay amount measurement unit 131 measures a delay amount inside the 5G system 10 from a difference between the output time TSe and the input time TSi set in Suffix Field of the SYNC message (step ST106). As described above, the delay amount measurement unit 131 measures the delay amount inside the 5G system 10 from the difference between the input time at which the 5G system 10 has acquired the periodically transmitted time-synchronization signal and the output time at which the 5G system 10 outputs the time-synchronization signal, the input time being included in the time-synchronization signal. The delay amount measurement unit 131 stores delay amount history information 600 including a delay amount measurement value, in delay amount history information 600 within the memory 123. The memory 123 stores the delay amount history information 600 including the delay amount measurement value measured by the delay amount measurement unit 131.

FIG. 9 is a diagram illustrating an example of the delay amount history information 600 stored in the memory 123 of the device-side interface conversion device 50 according to the present embodiment. The delay amount history information 600 includes identifiers 601 of the delay amount history information 600 stored by the delay amount measurement unit 131, delay amount measurement values 602 measured by the delay amount measurement unit 131, and a delay amount reference value 603 calculated by a moving average process of the delay amount measurement values 602. The delay amount history information 600 described herein is based on the assumption that the identifier 601 with a smaller number corresponds to an older delay amount measurement value. In a case where the number of registrations exceeds a maximum number, that is, N in the example of FIG. 9, the delay amount measurement unit 131 deletes information denoted by No. 0, and then reduces each of the numbers denoting the other pieces of information by one. As a method of calculating the delay amount reference value 603, the delay amount measurement unit 131 may add weight to each delay amount measurement value in addition to the moving average process, or may limit the number of samples to be averaged. Alternatively, the delay amount measurement unit 131 may use, as the delay amount reference value 603, the worst value of the delay amount measurement values registered in the delay amount history information 600.

The variation evaluation unit 132 acquires the delay amount reference value 603 of the delay amount history information 600 from the memory 123, and measures a variation amount of a delay amount measurement value from a difference between the delay amount reference value 603 and the delay amount measurement value measured by the delay amount measurement unit 131 (step ST107). The variation evaluation unit 132 performs variation amount evaluation, using the measured variation amount and a variation evaluation reference value 613 of a variation amount evaluation reference table 610 that defines an allowable variation amount for each traffic class (step ST108). The variation evaluation unit 132 determines the possibility of occurrence of an unexpected anomalous process, from the variation amount of the delay amount inside the 5G system 10. FIG. 10 is a diagram illustrating an example of the variation amount evaluation reference table 610 stored in the memory 123 of the device-side interface conversion device 50 according to the present embodiment. The variation amount evaluation reference table 610 includes transmission queue numbers 611, traffic classes 612, and variation evaluation reference values 613. The transmission queue numbers 611 correspond to the transmission queues 410a to 410h held by the time-division scheduler unit 142. The traffic classes 612 correspond one-to-one to the transmission queues 410a to 410h. The variation evaluation reference values 613 each serving as a reference value for determining whether a variation amount is allowable. As described above, the variation evaluation unit 132 measures the variation amount indicating an instantaneous variation of the delay amount, using the delay amount history information 600, and evaluates whether the variation amount is within an allowable range.

The message update unit 133 adds the delay amount measured by the delay amount measurement unit 131 to correction Field of the SYNC message (step ST109), and deletes Suffix Field added by the network-side interface conversion device 51 (step ST110). The communication unit 134 transfers the SYNC message to the End Station 21a (step ST111).

When receiving the SYNC message, the End Station 21a performs a procedure of measuring a path delay between the End Station 21a and the device-side interface conversion device 50 (step ST112). Specifically, the End Station 21a transmits a Pdelay_Req message which is a gPTP packet to the device-side interface conversion device 50, and receives a Pdelay_Resp message which is a gPTP packet from the device-side interface conversion device 50. Thereafter, when it is time to start the next periodic time-synchronization process which the TSN Bridge 20 sets with the periodic timer in step ST101, the above procedure repeated (step ST113).

Figure 11:
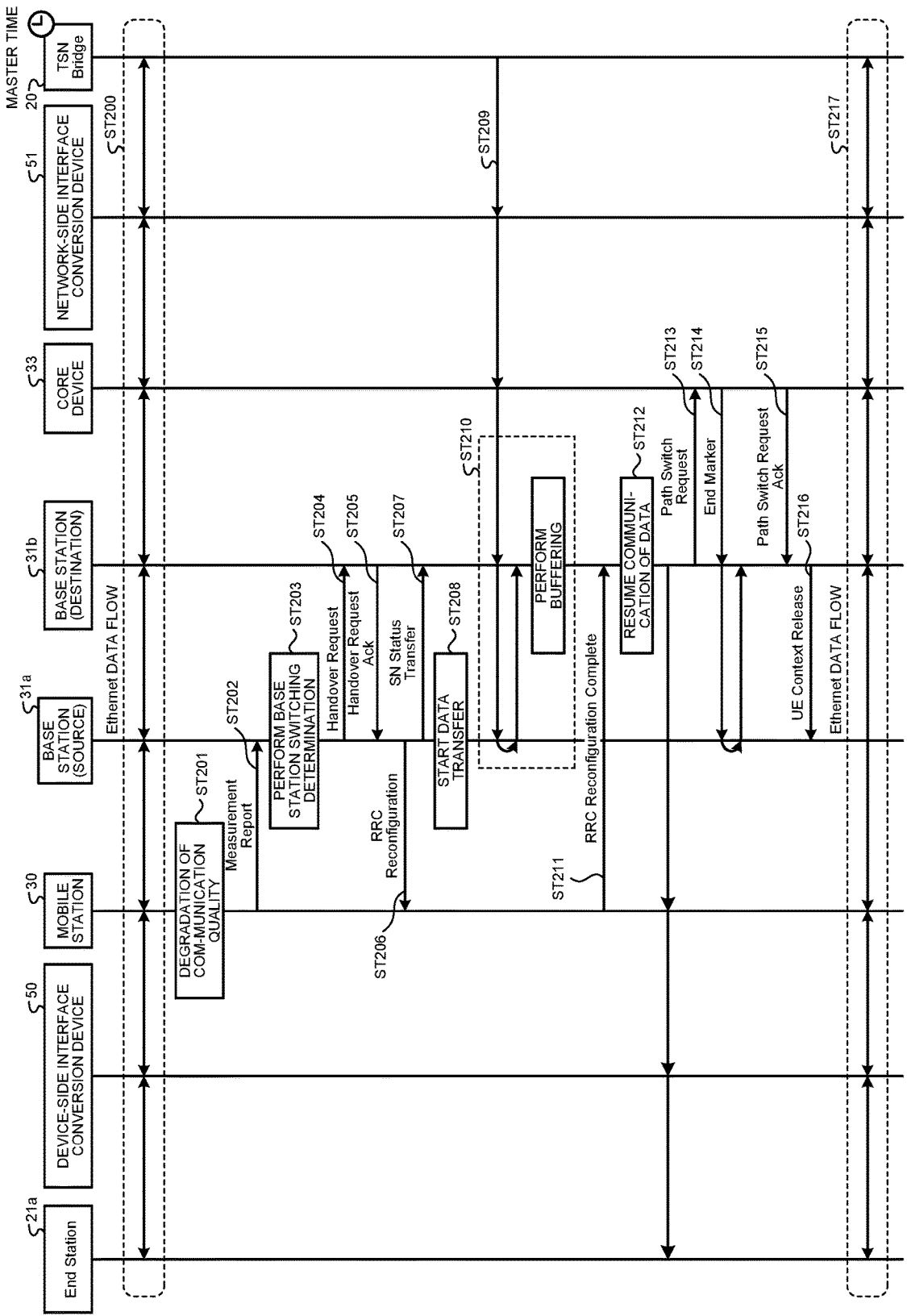
FIG. 11 is a sequence diagram illustrating an example of a base station switching procedure performed by the 5G system according to the present embodiment.

Next, a description will be made as to a base station switching procedure that is an example of a factor of variation in delay amount at a time of delay guarantee by a QoS in the 5G system 10. FIG. 11 is a sequence diagram illustrating an example of the base station switching procedure performed by the 5G system 10 according to the present embodiment. The description herein is based on the assumption that the TSN protocol and an Ethernet data flow are established among the 5G system 10, the TSN Bridge 20, and the End Station 21a (step ST200).

When detecting degradation of communication quality of the wireless signal 40 transmitted from a source base station 31a (step ST201), the mobile station 30 transmits a Measurement Report notifying the source base station 31a of the degradation of the communication quality and a destination base station 31b which the mobile station 30 also detects by measuring surrounding cells (step ST202). The source base station 31a is a base station from which the mobile station 30 is moving away. The destination base station is a base station 31b toward which the mobile station 30 is moving.

When receiving the Measurement Report from the mobile station 30, the source base station 31a performs base station switching determination (step ST203). The source base station 31a that has determined to execute base station switching transmits a Handover Request to the destination base station 31b (step ST204).

When receiving the Handover Request from the source base station 31a, the destination base station 31b transmits, as a response, Handover Request Acknowledgement to the source base station 31a in a case where the base station switching is acceptable (step ST205).

When completing advance preparation for the base station switching, the source base station 31a transmits, to the mobile station 30, RRC Reconfiguration notifying the start of the base station switching (step ST206). The source base station 31a stops data communication with the mobile station 30, and transfers, as SN Status Transfer, information such as a sequence number of packet data convergence protocol (PDCP) to the destination base station 31b (step ST207). In addition, the source base station 31a starts data transfer, i.e., starts transferring, to the destination base station 31b, data stored therein and addressed to the mobile station 30 (step ST208). Thereafter, in the 5G system 10, the data addressed to the mobile station 30 received from the core device 33 is transferred to the destination base station 31b via the source base station 31a, such that the destination base station 31b performs buffering of the data (steps ST209 to ST210).

When completing resynchronization with the wireless signal 40 transmitted from the destination base station 31b, the mobile station 30 transmits as a response an RRC Reconfiguration Complete message to the destination base station 31b (step ST211).

When receiving the RRC Reconfiguration Complete message from the mobile station 30, the destination base station 31b recognizes the completion of the base station switching for the mobile station 30, and resumes communication of data stored therein and addressed to the mobile station 30 (step ST212).

When receiving the completion of the base station switching from the destination base station 31b (step ST213), the core device 33 adds End Maker to final data to be transmitted to the source base station 31a in order to change a transmission destination of data addressed to the mobile station 30 from the source base station 31a to the destination base station 31b (step ST214). The core device 33 transmits, to the destination base station 31b, Path Switch Request Ack indicating the completion of the switching to the communication path between the destination base station 31b and the core device 33 (step ST215).

When recognizing the completion of the switching of the communication path with the core device 33, the destination base station 31b notifies the source base station 31a that all the base station switching processes for the mobile station 30 have been completed (step ST216), thereby establishing a new Ethernet data flow (step ST217).

As described above, the base station switching in the 5G system 10, which involves the process of the Ethernet data transfer between the base stations 31 and the resynchronization process by the mobile station 30, requires suspension of transmission of data to the mobile station during these processes. The time during which to suspend the data transmission leads to a variation in delay amount. Since the time-synchronization function in the present system updates the time information, taking into consideration the delay amount inside the 5G system 10, the time accuracy is not deteriorated. However, the arrival of an Ethernet packet is delayed relative to the time information in the gate control list 450 used for a time-division scheduling process designed in advance, and such a delay in the arrival affects the duration of a control period of the industrial protocol.

Figure 12:
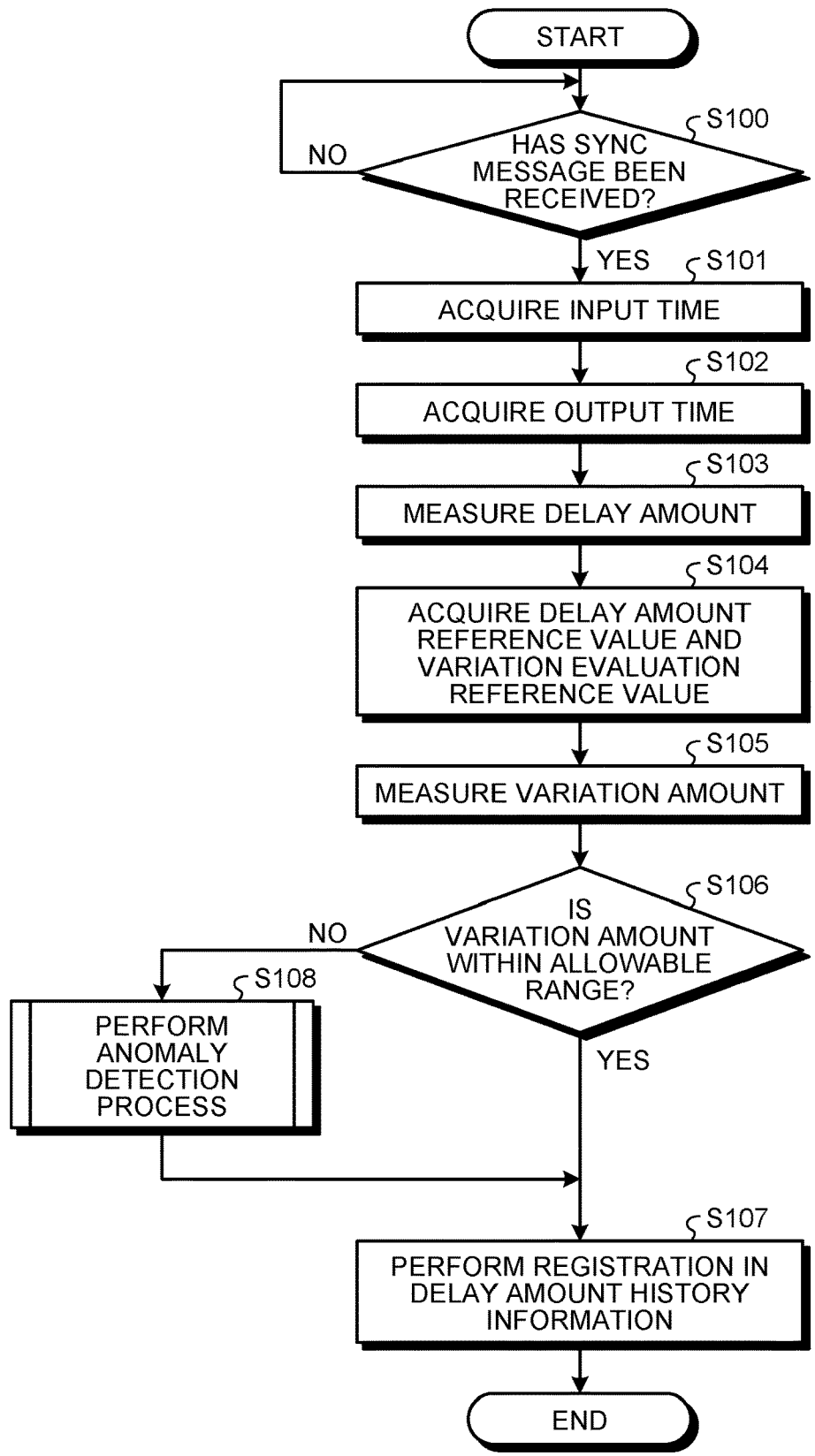
FIG. 12 is a flowchart illustrating an example of a variation amount evaluation process in an anomaly detection function of the device-side interface conversion device according to the present embodiment.

FIG. 12 is a flowchart illustrating an example of a variation amount evaluation process in an anomaly detection function of the device-side interface conversion device 50 according to the present embodiment. FIG. 12 illustrates the content of a process performed by the anomaly detection unit 141 of the device-side interface conversion device 50.

If the time-synchronization function unit 130 of the device-side interface conversion device 50 has not received a SYNC message which is a gPTP packet from the 5G device connection unit 110 (step S100: No), the time-synchronization function unit 130 waits until receiving the SYNC message. If the time-synchronization function unit 130 has received the SYNC message (step S100: Yes), the delay amount measurement unit 131 acquires the input time TSi set in Suffix Field of the SYNC message (step S101). The delay amount measurement unit 131 acquires the output time TSe from the time management unit 124 to the End Station 21a (step S102). The delay amount measurement unit 131 measures a delay amount dT_new inside the 5G system 10 from a difference between the acquired input time TSi and the acquired output time TSe (step S103).

The variation evaluation unit 132 acquires the delay amount reference value 603 of the delay amount history information 600 and acquires the variation evaluation reference value 613 of the variation amount evaluation reference table 610 from the memory 123 (step S104). The variation evaluation unit 132 measures a variation amount of a delay amount measurement value, from a difference between the delay amount reference value 603 and the delay amount measurement value measured by the delay amount measurement unit 131 (step S105). The variation evaluation unit 132 evaluates whether the variation amount is within an allowable range based on the variation evaluation reference value 613 (step S106). As illustrated in FIG. 10, the allowable range based on the variation evaluation reference value 613 varies depending on the traffic classes. If the variation amount is within the allowable range based on the variation evaluation reference value 613 (step S106: Yes), the variation evaluation unit 132 registers the delay amount dT_new in the delay amount history information 600 (step S107). If the variation amount is out of the allowable range based on the variation evaluation reference value 613 (step S106: No), the variation evaluation unit 132 notifies the anomaly detection unit 141 that the variation amount is out of the allowable range based on the variation evaluation reference value 613. The anomaly detection unit 141 performs an anomaly detection process (step S108). Specifically, in order to identify the cause of a problematic event related to wireless communication, the anomaly detection unit 141 performs, as the anomaly detection process, a process of storing, in the memory 123, a transmission queue number and a traffic class in which an anomaly has been detected, time at which the anomaly has been detected, time at which the anomaly has been eliminated, and Ethernet packet data communicated during that period of time. As described above, the anomaly detection unit 141 detects a communication anomaly in the 5G system 10 on the basis of the evaluation result provided by the variation evaluation unit 132. Thereafter, the variation evaluation unit 132 registers the delay amount dT_new in the delay amount history information 600 (step S107).

Figure 13:
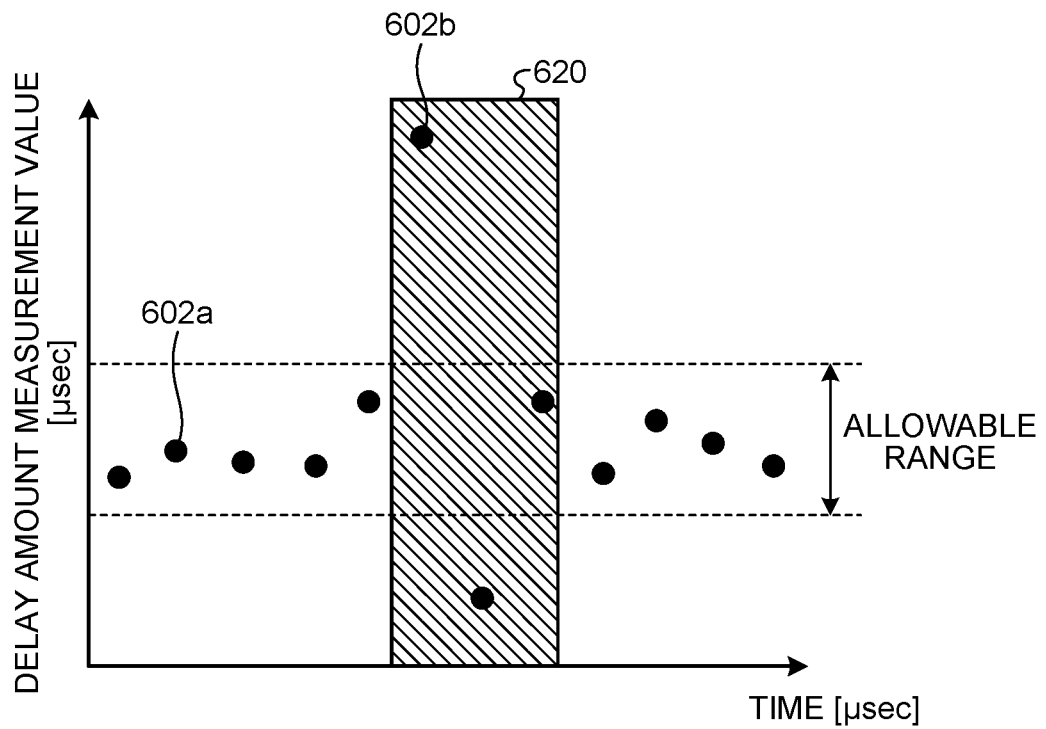
FIG. 13 is a diagram illustrating examples of delay amount measurement values at a time of base station switching in the 5G system according to the present embodiment.

FIG. 13 is a diagram illustrating examples of delay amount measurement values at a time of base station switching in the 5G system 10 according to the present embodiment. FIG. 13 supplements the influence on the delay amount due to the base station switching described in FIG. 11. In FIG. 13, the horizontal axis represents time, and the vertical axis represents delay amount measurement value. In FIG. 13, a measurement value 602a indicates a measurement value of which the evaluation result of the variation amount is within the allowable range, with respect to the allowable range based on the variation evaluation reference value 613. In addition, a measurement value 602b indicates a measurement value of which the evaluation result of the variation amount is out of the allowable range based on the variation evaluation reference value 613. The variation in the delay amount measurement values increases in a section 620 because the base station switching process requiring the suspension of the data transmission during the process of data transfer between the base stations 31 and the resynchronization process by the mobile station 30 is executed in the section 620. Therefore, the arrival of an Ethernet packet is delayed relative to the time information in the gate control list 450 used for the time-division scheduling process designed in advance.

Figure 14:
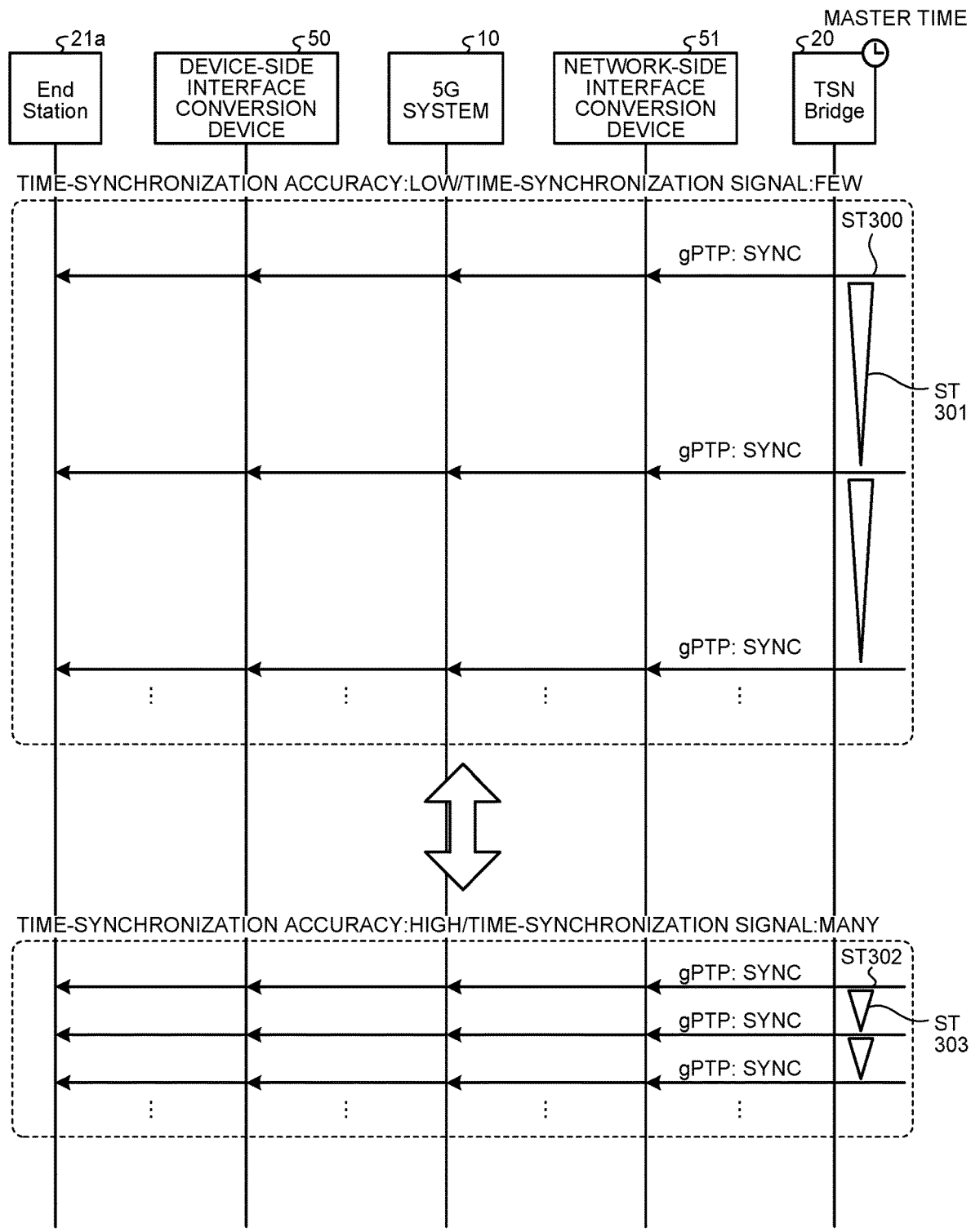
FIG. 14 is a diagram illustrating a relationship between a time-synchronization procedure and time-synchronization accuracy in the 5G system according to the present embodiment.

FIG. 14 is a diagram illustrating a relationship between a time-synchronization procedure and time-synchronization accuracy in the 5G system 10 according to the present embodiment. In order to start a time-synchronization process, the TSN Bridge 20 transmits a SYNC message to the device-side interface conversion device 50 and the End Station 21a via the network-side interface conversion device 51 (step ST300). The TSN Bridge 20 starts a periodic timer that measures a period of the time-synchronization process for transmitting the SYNC message next time (step ST301). The TSN Bridge 20 repeats the above process. The TSN Bridge 20 can change the period of the time-synchronization process measured by the periodic timer, and can improve the time-synchronization accuracy by setting a shorter period of the periodic timer short. That is, setting the shorter period of the periodic timer also provides an increase in the opportunity to perform anomaly detection, which contributes to improvement of the anomaly detection accuracy. On the other hand, the setting of such a shorter period increases the number of SYNC messages for time synchronization, thus, increasing the processing load of the TSN Bridge 20, and compressing transmission band in the 5G system 10 as well. For this reason, the mobile wireless communication network 1 can adjust the period of the periodic timer with trade-off between required time-synchronization accuracy and the number of time-synchronization signals (ST302 to ST303).

Figure 15:
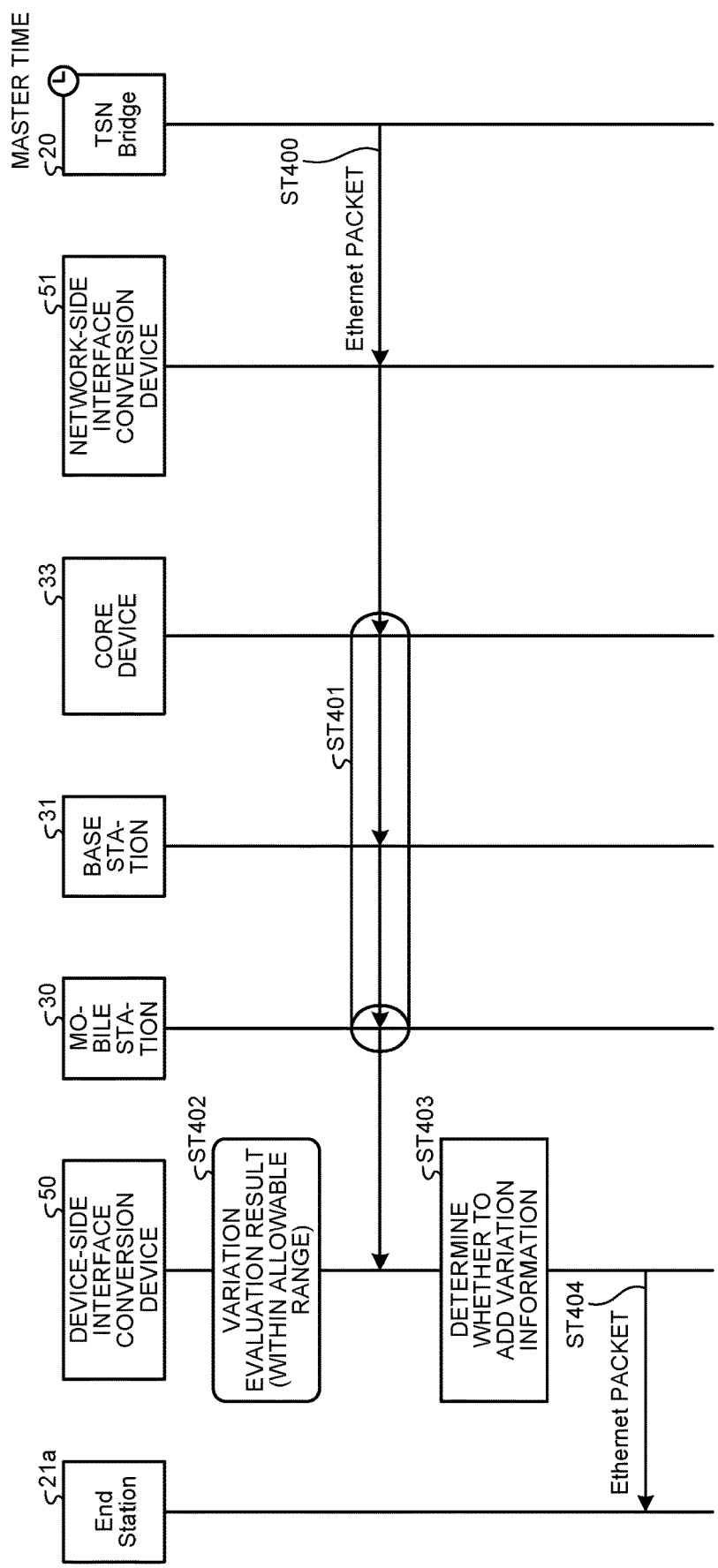
FIG. 15 is a sequence diagram illustrating an example of a variation information addition procedure for an Ethernet packet in a case where a variation evaluation result is within an allowable range in the 5G system according to the present embodiment.

FIG. 15 is a sequence diagram illustrating an example of a variation information addition procedure for an Ethernet packet in a case where a variation evaluation result is within an allowable range in the 5G system 10 according to the present embodiment. The anomaly detection process illustrated in FIG. 12 described above involves storing the detected information in the memory 123. The description herein is made as to a method in which detected variation information is notified to the outside. The TSN Bridge 20 transmits an Ethernet packet to the End Station 21a (step ST400). At that time, in the section from the core device 33 to the mobile station 30, the Ethernet packet is encapsulated by the wireless protocol (step ST401). In a case where the variation evaluation result is within the allowable range (step ST402), the device-side interface conversion device 50 determines whether to add variation information to the Ethernet packet (step ST403). In the present case, the variation evaluation result is within the allowable range, which does not provide an anomaly detection state. For this reason, the device-side interface conversion device 50 performs not the addition of the variation information but a process of transmitting the Ethernet packet on the basis of the transmission time of the time-division scheduling function unit 140 (step ST404).

Figure 16:
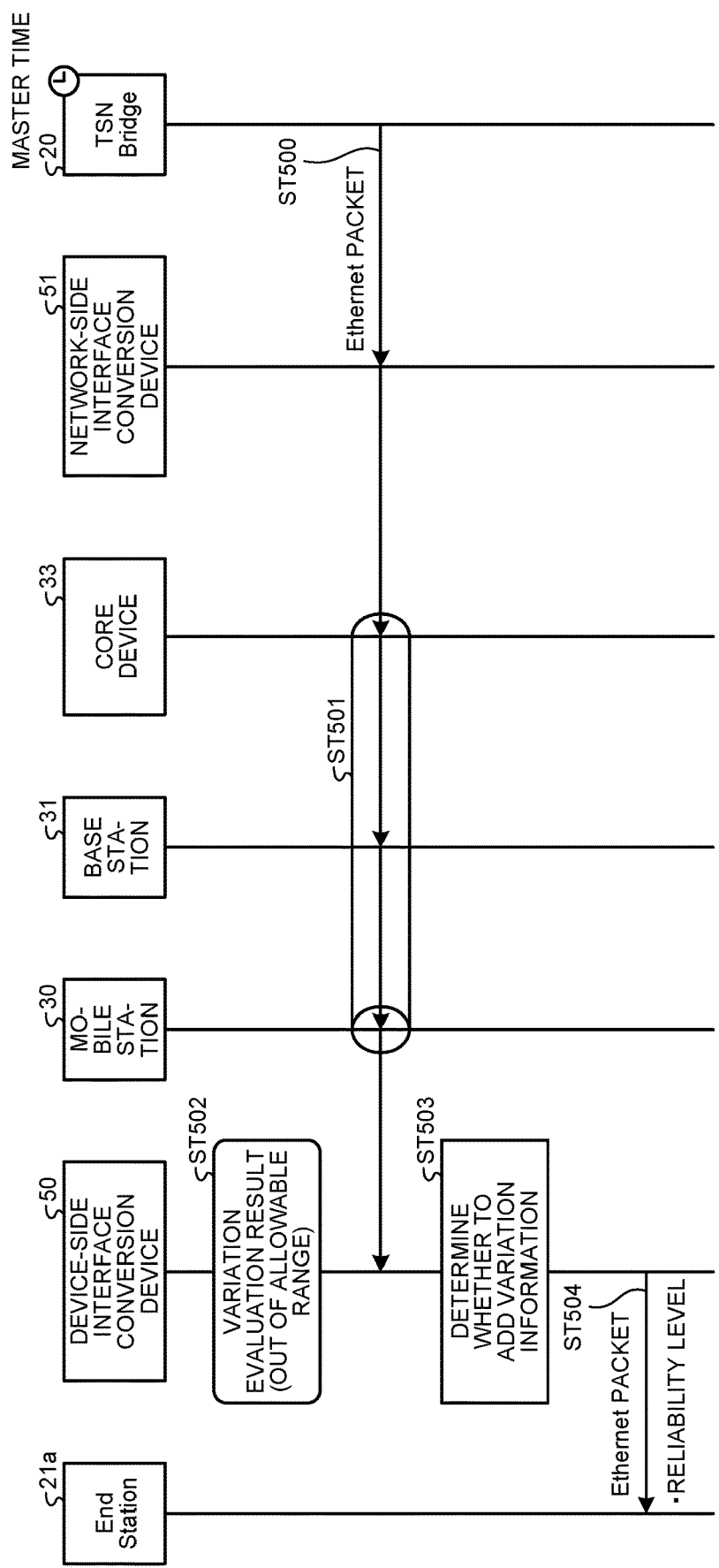
FIG. 16 is a sequence diagram illustrating an example of a variation information addition procedure for an Ethernet packet in a case where a variation evaluation result is out of the allowable range in the 5G system according to the present embodiment.

FIG. 16 is a sequence diagram illustrating an example of a variation information addition procedure for an Ethernet packet in a case where a variation evaluation result is out of the allowable range in the 5G system 10 according to the present embodiment. The TSN Bridge 20 transmits an Ethernet packet to the End Station 21a (step ST500). At that time, in the section from the core device 33 to the mobile station 30, the Ethernet packet is encapsulated by the wireless protocol (step ST501). In a case where the variation evaluation result is out of the allowable range (step ST502), the device-side interface conversion device 50 determines whether to add variation information to the Ethernet packet (step ST503). In the present case, the variation evaluation result is out of the allowable range, which provides an anomaly detection state. For this reason, the device-side interface conversion device 50 adds reliability level information into the Ethernet packet and performs a process of transmitting the Ethernet packet on the basis of the transmission time of the time-division scheduling function unit 140 (step ST504). Specifically, in the device-side interface conversion device 50, the message update unit 133 adds information on the communication anomaly detected by the anomaly detection unit 141 to the Ethernet packet to be transmitted to the outside. The communication unit 134 transmits the Ethernet packet having the information on the communication anomaly added thereto.

The End Station 21a receives the Ethernet packet and checks the reliability level information, such that the End Station 21a can recognize that the Ethernet packet is under an influence specific to wireless communication. In addition, in a case where an anomaly is detected, the End Station 21a stores the Ethernet packet in a log, thereby facilitating identifying a factor at a subsequent stage. The reliability level information may be added to an Ethernet header, an Internet Protocol (IP) header, or the like as an option header of a newly provided protocol or an existing protocol, or may be expressed by setting a flag in a specific region of each piece of header information. Furthermore, regarding the reliability level information, reliability may be expressed not only by the presence or absence of a detected anomaly, but also by providing a plurality of stages depending on a variation amount.

Figure 17:
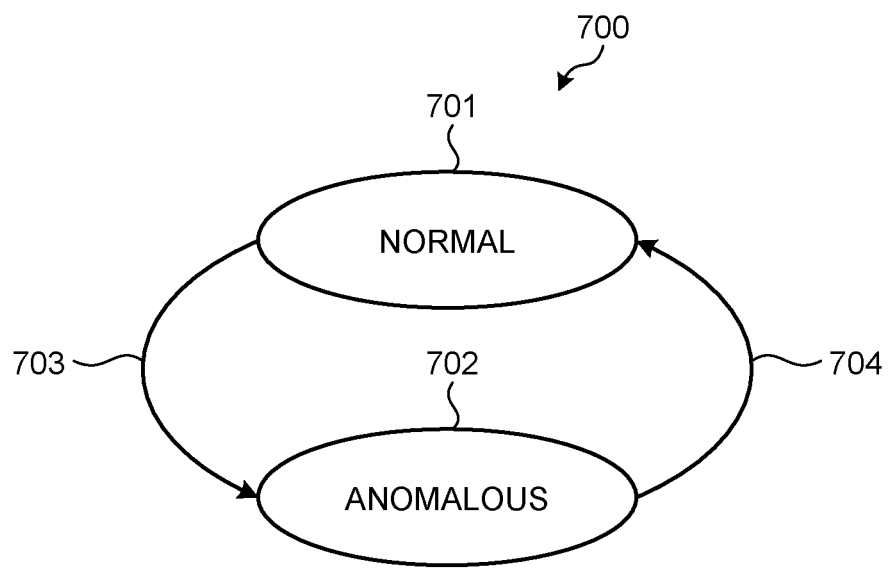
FIG. 17 is a diagram illustrating an example of state transition in the anomaly detection function of the device-side interface conversion device according to the present embodiment.

FIG. 17 is a diagram illustrating an example of state transition in the anomaly detection function of the device-side interface conversion device 50 according to the present embodiment. The anomaly detection unit 141 holds state transition 700. With respect to the state transition 700, the device-side interface conversion device 50 has a normal state 701 in which a variation amount is within the allowable range and an anomalous state 702 in which a variation amount is out of the allowable range. The device-side interface conversion device 50 performs state transition 703 or state transition 704 in accordance with an evaluation result provided by the variation amount. The transition from the anomalous state 702 to the normal state 701 is triggered off by events including, but not limited to, the restoration of the evaluation result of the variation amount into the allowable range or by a lapse of a specific time after the transition to the anomalous state 702. The present embodiment does not specify the trigger for transition from the anomalous state 702 to the normal state 701.

The description has been made as to the anomaly detection method performed by the device-side interface conversion device 50. In a case where the TSN Bridge is present on the device side, the network-side interface conversion device 51 performs processes similar to those in the above-described method.

Next, a hardware configuration of the device-side interface conversion device 50 will be described. In the device-side interface conversion device 50, the external interface 100 and the 5G device connection unit 110 are external interfaces. The device management unit 120, the time-synchronization function unit 130, and the time-division scheduling function unit 140 are implemented by processing circuitry. The processing circuitry may be a processor that executes a program stored in a memory and the memory, or may be dedicated hardware. The processing circuitry is also referred to as a control circuit.

Figure 18:
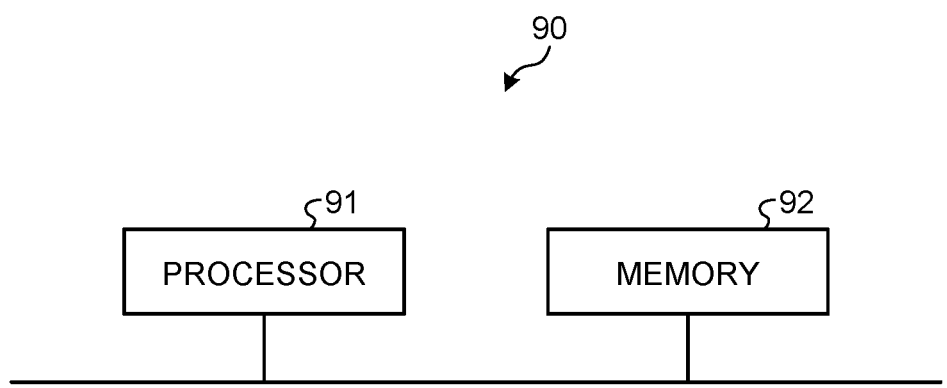
FIG. 18 is a diagram illustrating an example configuration of processing circuitry in a case where a processing circuitry of the device-side interface conversion device according to the present embodiment is implemented by a processor and a memory.

FIG. 18 is a diagram illustrating an example configuration of processing circuitry 90 in a case where processing circuitry of the device-side interface conversion device 50 according to the present embodiment is implemented by a processor and a memory. The processing circuitry 90 illustrated in FIG. 18 is a control circuit, and includes a processor 91 and a memory 92. When the processing circuitry 90 is configured with the processor 91 and the memory 92, functions of the processing circuitry 90 are implemented by software, firmware, or a combination of software and firmware. The software or the firmware is described as a program and stored in the memory 92. In the processing circuitry 90, the processor 91 reads and executes the program stored in the memory 92, thereby implementing the functions. That is, the processing circuitry 90 includes the memory 92 for storing a program with which a process of the device-side interface conversion device 50 is executed as a result. It can also be said that this program is a program for causing the device-side interface conversion device 50 to execute the functions implemented by the processing circuitry 90. This program may be provided by a storage medium having stored the program therein, or may be provided by other means such as a communication medium.

It can also be said that the above-described program is a program that causes the device-side interface conversion device 50 to execute: a first step, performed by the delay amount measurement unit 131, of measuring a delay amount inside the 5G system 10 from a difference between the input time TSi at which the 5G system 10 has acquired a periodically transmitted time-synchronization signal and the output time TSe at which the 5G system 10 outputs the time-synchronization signal, the input time Tsi being included in the time-synchronization signal; a second step, performed by the delay amount measurement unit 131, of storing, in the memory 123, the delay amount history information 600 including a delay amount measurement value which is the delay amount; a third step, performed by the variation evaluation unit 132, of measuring a variation amount indicating an instantaneous variation of the delay amount, using the delay amount history information 600, and evaluating whether the variation amount is within an allowable range; and a fourth step, performed by the anomaly detection unit 141, of detecting a communication anomaly in the 5G system 10 on the basis of an evaluation result provided by the variation evaluation unit 132.

The processor 91 is, for example, a central processing unit (CPU), a processing device, an arithmetic device, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disc (DVD).

Figure 19:
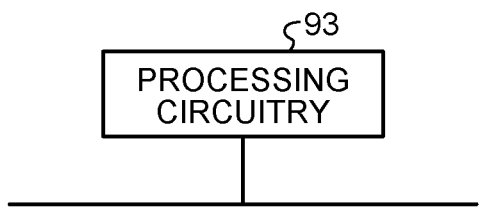
FIG. 19 is a diagram illustrating an example of processing circuitry in a case where the processing circuitry of the device-side interface conversion device according to the present embodiment is configured with dedicated hardware.

FIG. 19 is a diagram illustrating an example of processing circuitry 93 in a case where the processing circuitry of the device-side interface conversion device 50 according to the present embodiment is configured with dedicated hardware. The processing circuitry 93 illustrated in FIG. 19 corresponds to, for example, a single circuit, a composite circuit, a programmed processor, a parallel programmed processor, an application specific integrated circuit (ASIC), a field programmable gate array (FPGA), or a combination thereof. A part of the processing circuitry may be implemented by dedicated hardware and another part thereof may be implemented by software or firmware. Thus, the processing circuitry can implement the above-described functions by dedicated hardware, software, firmware, or a combination thereof.

The hardware configuration of the device-side interface conversion device 50 has been described, and a hardware configuration of the network-side interface conversion device 51 is similar thereto. In the network-side interface conversion device 51, the external interfaces 200a and 200b are external interfaces. The device management unit 210, the time-synchronization function unit 220, and the time-division scheduling function unit 230 are implemented by processing circuitry. The processing circuitry may be a processor that executes a program stored in a memory and the memory, or may be dedicated hardware.

As described above, according to the present embodiment, the device-side interface conversion device 50 and the network-side interface conversion device 51 measure an instantaneous variation amount of a delay amount from time information of a time-synchronization signal that achieves highly accurate time synchronization, evaluate the instantaneous variation amount, and detect a communication failure depending on the duration of a control period of an industrial protocol in which a transmission time of the time-synchronization signal is managed. As a result, the device-side interface conversion device 50 and the network-side interface conversion device 51 can identify the cause of a problematic event related to wireless communication in the mobile wireless communication network 1 that transmits a highly accurately time-synchronized industrial protocol.

The interface conversion device according to the present disclosure achieves an effect that it is possible to detect a communication failure in a mobile wireless communication network on which an industrial protocol is transmitted.

The configurations described in the embodiment above are merely examples and can be combined with other known technology, embodiments can be combined with each other, and part of the configurations can be omitted or modified without departing from the gist thereof.

What is claimed is:

1. An interface conversion device of a mobile communication system to transmit an industrial protocol, the device comprising:
    delay amount measurement circuitry to measure a delay amount inside the mobile communication system from a difference between an input time at which the mobile communication system has acquired a periodically transmitted time-synchronization signal and an output time at which the mobile communication system outputs the time-synchronization signal, the input time being included in the time-synchronization signal;
    storage circuitry to store delay amount history information including a delay amount measurement value measured by the delay amount measurement circuitry;
    variation evaluation circuitry to measure a variation amount indicating an instantaneous variation of the delay amount by acquiring a delay amount reference value from the delay amount history information and measuring a variation amount of a delay amount measurement value from a difference between the delay mount reference value and the measured delay amount inside the mobile communication system and to evaluate whether the variation amount is within an allowable range; and
    anomaly detection circuitry to detect a communication anomaly in the mobile communication system on a basis of an evaluation result provided by the variation evaluation circuitry.

2. The interface conversion device according to claim 1, comprising:
    message update circuitry to add information on the communication anomaly detected by the anomaly detection circuitry to a packet to be transmitted to outside; and
    communication circuitry to transmit the packet having the information on the communication anomaly added thereto.

3. The interface conversion device according to claim 1, wherein
    the allowable range varies depending on traffic classes.

4. The interface conversion device according to claim 2, wherein
    the allowable range varies depending on traffic classes.

5. A control circuit to control an interface conversion device of a mobile communication system to transmit an industrial protocol, the control circuit causing the interface conversion device to:
    measure a delay amount inside the mobile communication system from a difference between an input time at which the mobile communication system has acquired a periodically transmitted time-synchronization signal and an output time at which the mobile communication system outputs the time-synchronization signal, the input time being included in the time-synchronization signal;
    store delay amount history information including a delay amount measurement value that is the delay amount;
    measure a variation amount indicating an instantaneous variation of the delay amount by acquiring a delay amount reference value from the delay amount history information and measuring a variation amount of a delay amount measurement value from a difference between the delay mount reference value and the measured delay amount inside the mobile communication system and evaluate whether the variation amount is within an allowable range; and
    detect a communication anomaly in the mobile communication system on a basis of a result of the evaluation.

6. A non-transitory storage medium having stored therein a program to control an interface conversion device of a mobile communication system to transmit an industrial protocol, the program causing the interface conversion device to:
    measure a delay amount inside the mobile communication system from a difference between an input time at which the mobile communication system has acquired a periodically transmitted time-synchronization signal and an output time at which the mobile communication system outputs the time-synchronization signal, the input time being included in the time-synchronization signal;
    store delay amount history information including a delay amount measurement value that is the delay amount;
    measure a variation amount indicating an instantaneous variation of the delay amount by acquiring a delay amount reference value from the delay amount history information and measuring a variation amount of a delay amount measurement value from a difference between the delay mount reference value and the measured delay amount inside the mobile communication system and evaluate whether the variation amount is within an allowable range; and
    detect a communication anomaly in the mobile communication system on a basis of a result of the evaluation.

7. An anomaly detection method performed by an interface conversion device of a mobile communication system to transmit an industrial protocol, the method comprising:
    measuring a delay amount inside the mobile communication system from a difference between an input time at which the mobile communication system has acquired a periodically transmitted time-synchronization signal and an output time at which the mobile communication system outputs the time-synchronization signal, the input time being included in the time-synchronization signal;
    storing delay amount history information including a delay amount measurement value that is the delay amount;
    measuring a variation amount indicating an instantaneous variation of the delay amount by acquiring a delay amount reference value from the delay amount history information and measuring a variation amount of a delay amount measurement value from a difference between the delay mount reference value and the measured delay amount inside the mobile communication system and evaluating whether the variation amount is within an allowable range; and
    detecting a communication anomaly in the mobile communication system on a basis of a result of the evaluation.

8. The interface conversion device according to claim 1, wherein the delay amount reference value is calculated as a moving average process of the delay amount measurement values in the delay amount history information.

* * * * *